United States Patent Office 2,897,960
Patented Aug. 4, 1959

2,897,960

PRESSURE-SENSITIVE ADHESIVE TAPE

Harold J. Revoir, St. Paul, Minn., assignor to Minnesota Mining and Manufacturing Company, St. Paul, Minn., a corporation of Delaware No Drawing. Application April 11, 1958
Serial No. 727,768

4 Claims. (Cl. 206—59)

This invention relates to pressure-sensitive adhesive tapes having a normally tacky and pressure-sensitive adhesive layer firmly adherently bonded to a thin, tough, strong, flexible polyvinyl chloride film base or backing member, and has particular reference to sub-coats or primer layers providing the desired bond between said backing and adhesive layer.

Lightly plasticized or unplasticized polyvinyl chloride film has for some time been available, for example under the names "Vynan" and "Polytherm," in thicknesses of the order of 1.2–1.6 mils (0.0012–0.0016 inch). The film is strong and flexible. It may be stretched and deformed under high stress, but under normal hand pulling ordinarily will stretch no more than "cellophane" (regenerated cellulose) film of equivalent thickness. Like "cellophane," the film has a smooth, dense surface. Unlike "cellophane," it is hydrophobic rather than hydrophilic. Consequently adhesive primers based on hydrophilic colloidal agglutinants, such as those of Drew Patent No. 2,328,066, or Coulter Patent No. 2,328,057, and which are highly effective in bonding rubber-resin type pressure-sensitive adhesives to "cellophane," are found to be inadequate as primers for these polyvinylchloride backings.

Certain rubber-resin compositions have been found to deposit firmly bonded surface coatings on unplasticized polyvinyl chloride films. One outstanding example of such a composition consists essentially of a mixture of rubbery butadiene-acrylonitrile copolymer ("Hycar OR–25") with about one-half its weight of pure hydrocarbon thermoplastic terpene resin of zero acid number and melting at 115° C. ("Piccolyte S–115"), applied from solution in suitable organic solvents. Although such a coating adheres firmly to the polyvinylchloride film, it is found that coatings of pressure-sensitive adhesive applied thereover are easily removed, for example on rapidly unwinding the coated strip from the roll form in which pressure-sensitive adhesive tape products are normally marketed.

Attempts have heretofore been made to include with the just-described compositions a proportion of some further component which, while remaining firmly bonded or embedded in the dry and non-tacky layer of polymer and resin, will still present an exposed surface layer to which the pressure-sensitive adhesive will adequately bond. Butadienestyrene rubbery polymer ("GR–S" rubber) is a component of many pressure-sensitive adhesives and would appear to be an effective additive for such purposes. Tests have shown, however, that the addition of "GR–S" rubber to "Hycar"—"Piccolyte" coating compositions produces a material which either fails to retain a subsequently applied coating of pressure-sensitive adhesive, or itself fails to establish a firm adherent bond to the polyvinyl chloride film, so that the coated product is ineffective as a pressure-sensitive adhesive tape.

The present invention overcomes these and other difficulties and deficiencies and makes possible a pressure-sensitive adhesive tape having a water-insoluble pressure-sensitive adhesive coating firmly adherently bonded to a strong and tough, flexible, unplasticized polyvinyl chloride film base or backing. The tape product can be wound into roll form, held for long periods of time under drastic storage or test conditions, and subsequently unwound from the roll without offsetting of the adhesive. It may likewise be adhered to various surfaces, e.g. glass, metal, painted or enameled wood or metal, etc. and subsequently removed therefrom by peeling or stripping, again without any offsetting of the adhesive to the underlying surface. Two strips of the tape may even become cohered together in adhesive-to-adhesive contact, as frequently occurs accidentally in handling such tape products, and subsequently stripped apart without offsetting of either adhesive layer. These results are attained, in accordance with the principles of this invention, with highly aggressively tacky as well as less aggressively tacky pressure-sensitive adhesives. Tape products have thus been made, e.g. of 1.2-mil unplasticized polyvinylchloride film coated with aggressively tacky rubber-resin pressure-sensitive adhesive, which, when pressed into adhesive contact with a clean polished steel panel and stripped therefrom at slow speed, showed a removal effort or "adhesion value" of as high as 40 ozs. per half inch width of tape; yet the tape was removed without any trace of the adhesive remaining on the metal. The effective bonding of pressure-sensitive adhesive coatings of such highly aggressive tackiness and adhesive power to unplasticized polyvinyl chloride films had not been accomplished prior to my invention, at least insofar as I have been able to determine.

Specific illustrative means for accomplishing these unique and highly useful results will now be provided in terms of typical examples, it being understood that equivalents thereof are likewise contemplated as coming within the scope of the invention and of the appended claims.

*Example 1*

A terpolymer is prepared in aqueous emulsion form by conventional emulsion polymerization techniques from 72 parts by weight of butadiene, 18 parts of styrene, and 10 parts of acrylonitrile. Methyl isobutyl ketone is added to the emulsion, dissolving the polymer; and the solution is separated from the aqueous remainder by centrifuging. At a polymer concentration of 12.5%, the solution has a Brookfield viscosity at room temperature of approximately 400. Evaporation of the solvent leaves a slightly tacky rubbery polymer residue.

A suitable churn is charged with 410 parts of heptane and 4.1 parts of ethyl alcohol, and sufficient of the terpolymer solution is added to supply 53 parts of the polymer. There is then added 50 parts of freshly crushed "Piccolyte S–115" terpene resin, 47 parts of rubbery butadiene-styrene copolymer (GR–S No. 1011, a copolymer of approximately 75 parts butadiene and 25 parts styrene), and 250 parts of methyl isobutyl ketone. The GR–S rubber is first lightly milled on a rubber-mill and is added in the form of small pieces for rapid solubility. The mixture is churned until smooth and free of lumps, and is then ready for use.

The primer mixture is applied, preferably by means of coating rolls, to one major surface of a strip of thin unplasticized polyvinylchloride film at a minimum practical weight required to completely and uniformly cover the surface, and the coating is dried at moderately elevated temperature. There is next applied a coating of normally tacky pressure-sensitive adhesive, consisting essentially of 100 parts of natural rubber and 75 parts of "Piccolyte S–115" resin, applied from solution in heptane, and this coating is similarly dried. The finished strip is cut into desired widths and wound on suitable cores to provide rolls of pressure-sensitive adhesive tape. The tape may be unwound from the roll, and strips separated from face-to-face contact, without offsetting of adhesive. It has an adhesion value to a polished steel test panel of up to 40 ounces per half inch width.

*Example 2*

In this example the primer composition is prepared from 53 parts of the terpolymer of Example 1 and 47 parts of the GR–S No. 1011 polymer, combined in a solvent mixture as in Example 1 but without the tackifier resin. It is coated on polyvinylchloride film in minimum thickness, dried, and a coating of a pressure-sensitive adhesive composition applied and dried, as in Example 1. The resulting tape product has an adhesion value to steel of 29–31 ozs. per half inch width. The adhesive remains firmly adherently bonded to the backing during unwinding of the tape from roll form, removal of the tape from the steel surface, and separation of the tape from adhesive-to-adhesive contact with itself.

Up to about 200 parts of the terpene resin of Example 1 may be used with the amounts of terpolymer and copolymer there specified, and ordinarily the addition of such materials will provide an economic advantage; however the terpene resin may be omitted as in Example 2.

Excessive amounts, e.g. more than about 200 parts, of the terpene resin in the formula of Example 1, reduce the ability of the primer to bond to the polyvinyl chloride film. For example, at 300 parts of terpene resin the adhesive and primer transferred completely from a segment of the coated film to another similar segment placed in adhesive-to-adhesive contact therewith and then stripped away.

*Example 3*

A terpolymer is prepared in emulsion form from butadiene, styrene and acrylonitrile as in Example 1 but in the ratio of 80:10:10. The polymer is recovered in solution form and mixed with rubbery butadiene-styrene polymer (GR–S No. 1011) and compatible tackifier resin ("Piccolyte S–115") in the ratio of 53:47:50. The solution is coated on thin polyvinylchloride film as a primer layer, over which is then coated a layer of pressure-sensitive adhesive, all as in Example 1. The resulting pressure-sensitive adhesive tape product is wound into roll form and unwound therefrom, adhered to various surfaces and removed therefrom, and recovered from adhesive-to-adhesive contact, without offsetting of adhesive.

Still stronger bonding between polyvinyl chloride film and pressure-sensitive adhesive is obtained by increasing the proportion of the terpolymer in the above formula to 60 parts while decreasing the proportion of copolymer to 40 parts.

*Example 4*

In this example the proportions of monomers employed in making the terpolymer are 45-butadiene, 45-styrene and 10-acrylonitrile. Useful bonds are obtained with 40 parts of this terpolymer combined with 60 parts of GR–S and 50 parts of terpene resin; more effective bonding is obtained by increasing the terpolymer to 53 parts while reducing the GR–S to 47 parts.

GR–S No. 1011 is a preferred example of rubbery butadiene-styrene copolymers soluble in the mixture of heptane and methyl isobutyl ketone and useful in the practice of this invention. Other equivalent soluble rubbery copolymers of butadiene and styrene or equivalent monomers are also useful and are to be considered as coming within the scope of the invention.

Ratios of terpolymer and GR–S copolymer may usefully be varied between the approximate limits of 25:75 and 70:30. With less than 25 parts of terpolymer, the primer and adhesive frequently transfer when the tape is rapidly unwound from roll form, or more particularly when segments are separated from face-to-face contact as described in the case of excessive amounts of terpene resin. Above about 70 parts of terpolymer, the primer coating is not effective in retaining the layer of pressure-sensitive adhesive. With unplasticized polyvinyl chloride film, pressure-sensitive adhesive, butadiene-styrene-acrylonitrile terpolymer, and butadiene-styrene copolymer, all as defined in the above specific examples, it is preferred to employ terpolmer: copolymer ratios within the range of 33:67 to 60:40 parts by weight. A particularly effective formulation employs 53 parts of the terpolymer, 47 parts of the copolymer, and 50 parts of the terpene resin, as described in Example 1.

The terpolymer is preferably prepared by emulsion polymerization and then converted to solvent solution without intermediate drying, as indicated in Example 1. A 10–12 percent solution in methyl isobutyl ketone or other substantially water-insoluble volatile ketone solvent has been found convenient. Small traces of water may remain in such solution without observable effect on the resulting product.

The material may be further purified by washing to remove all water-soluble residues remaining from the polymerization recipe.

Terpolymers of butadiene, styrene and acrylonitrile in the approximate proportions of 7:2:1 produce excellent results in the primer compositions of this invention and are preferred. It has been shown in specific examples that the proportions of butadiene and styrene may be varied within the approximate limits of 1:1 to 8:1 while maintaining a concentration of about 10% of acrylonitrile. The amount of acrylonitrile may also be varied, but to a much lesser extent. At least about 5% is required in order to obtain a usefully high degree of anchorage of the primer coating to the polyvinyl chloride film. Above about 20% of acrylonitrile the terpolymer has been found to be difficult to process. Accordingly it is preferred to restrict the amount of acrylonitrile to about 5–20% of the total monomers, with approximately 10% ordinarily providing the best overall results in terms both of effectiveness of priming action and ease of processing.

The particular pressure-sensitive adhesive identified in Example 1 has a high adhesion value and is aggressively tacky, and tape products coated with such adhesive adhere strongly to many surfaces on mere contact or on light finger-tip pressure. Other pressure-sensitive tape adhesives having similarly highly aggressive properties, as well as others having substantially lower tackiness or adhesion value, have also been found useful. One example is a blend of 50 parts of rubber, 50 parts of GR–S rubber and 60 parts of pentaerythritol abietate tackifier resin ("Pentalyn A"). Another example is polyvinyl n-butyl ether blended with a small proportion of terpene phenolic tackifier resin ("Newport S").

Although the butadiene-styrene-acrylonitrile terpolymer and the butadiene-styrene copolymer are quite similar in composition, and although neither of itself is capable of providing anything approaching adequate priming action, it has here been shown that mixtures of the two polymers in suitable proportions, and with or without added tackifier resin, are, surprisingly, capable of providing a firmly adherent bond and a fully effective priming action between deformation-resistant thin flexible polyvinyl chloride film backings and water-insoluble pressure-sensitive tape adhesives in the manufacture of pressure-sensitive adhesive tape products.

What I claim is as follows:

1. Pressure-sensitive adhesive tape capable of being wound in roll form and unwound therefrom in normal use, and of being pressed into adhesive-to-adhesive contact and separated therefrom, without offsetting of the adhesive layer, said tape consisting essentially of a thin flexible deformation-resistant polyvinyl chloride film backing and a coating of pressure-sensitive adhesive firmly adherently bonded thereto by an intervening thin continuous adhesive primer layer comprising (a) about 25–70 parts by weight of a rubbery terpolymer of about 5–20 percent of acrylonitrile with correspondingly 95–80 percent of butadiene and styrene in the approximate weight ratio of 1:1 to 8:1, and (b) correspondingly 75–30 parts of a rubbery copolymer of butadiene and styrene.

2. Pressure-sensitive adhesive tape wound on itself in roll form and capable of being unwound therefrom, and of being pressed into adhesive-to-adhesive contact and separated therefrom, without offsetting of adhesive; said tape consisting essentially of a thin flexible deformation-resistant polyvinyl chloride film backing and a coating of pressure-sensitive adhesive firmly adherently bonded thereto by an intervening thin continuous adhesive primer layer comprising (a) about 33 to about 60 parts by weight of a terpolymer of butadiene, styrene and acrylonitrile in the approximate weight ratio of 7:2:1, and (b) correspondingly about 77 to about 40 parts of a rubbery copolymer of butadiene and styrene.

3. Pressure-sensitive adhesive tape consisting essentially of a thin, flexible, deformation-resistant polyvinyl chloride film backing and an aggressively adherent rubber-resin pressure-sensitive adhesive coating firmly adherently bonded thereto by an intervening thin continuous adhesive primer layer consisting essentially of 53–60 parts by weight of a terpolymer of 72 parts butadiene, 18 parts styrene, and 10 parts acrylonitrile, correspondingly 47–40 parts of a rubbery copolymer of butadiene and styrene, and 0–200 parts of tackifier resin.

4. An adhesive primer composition for forming a firm adherent bond between a thin, flexible, deformation-resistant, unplasticized polyvinyl chloride film backing and a pressure-sensitive adhesive coating, comprising, in solution in a volatile organic solvent mixture, about 25–70 parts by weight of a rubbery terpolymer of about 5–20 percent by weight of acrylonitrile with correspondingly 95–80 percent of butadiene and styrene in the approximate weight ratio of 1:1 to 8:1, correspondingly about 75–30 parts of a rubbery copolymer of butadiene and styrene, and up to about 200 parts, based on 100 parts of mixed polymers, of tackifier resin.

References Cited in the file of this patent

UNITED STATES PATENTS

| | | |
|---|---|---|
| 2,527,162 | Veinderbilt et al. | Oct. 24, 1950 |
| 2,576,148 | Schectman | Nov. 27, 1951 |
| 2,647,843 | Bemmels | Aug. 4, 1953 |